Figure 1:
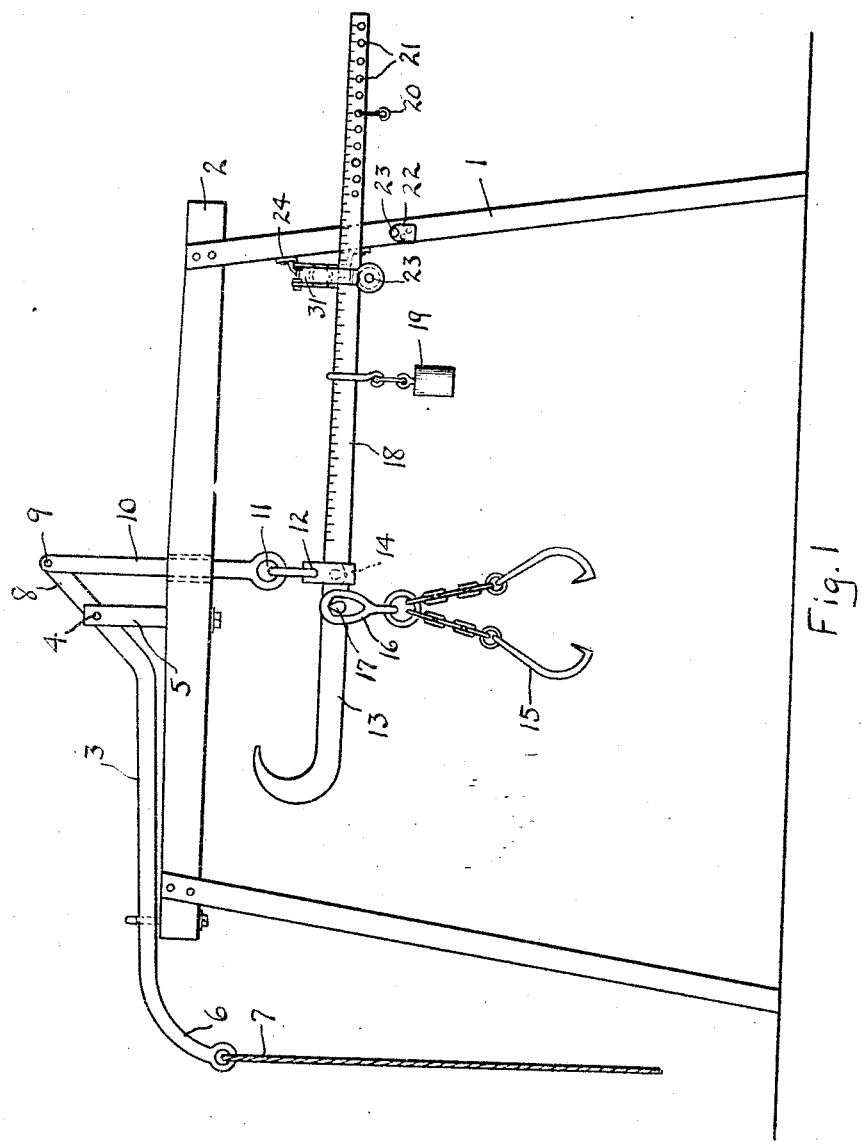

Aug. 11, 1925.

C. J. SUHM 1,549,159

WEIGHING MACHINE ATTACHMENT

Filed Feb. 19, 1924

2 Sheets-Sheet 1

C. J. Suhm. Inventor

By Jesse R. Stone

Attorney

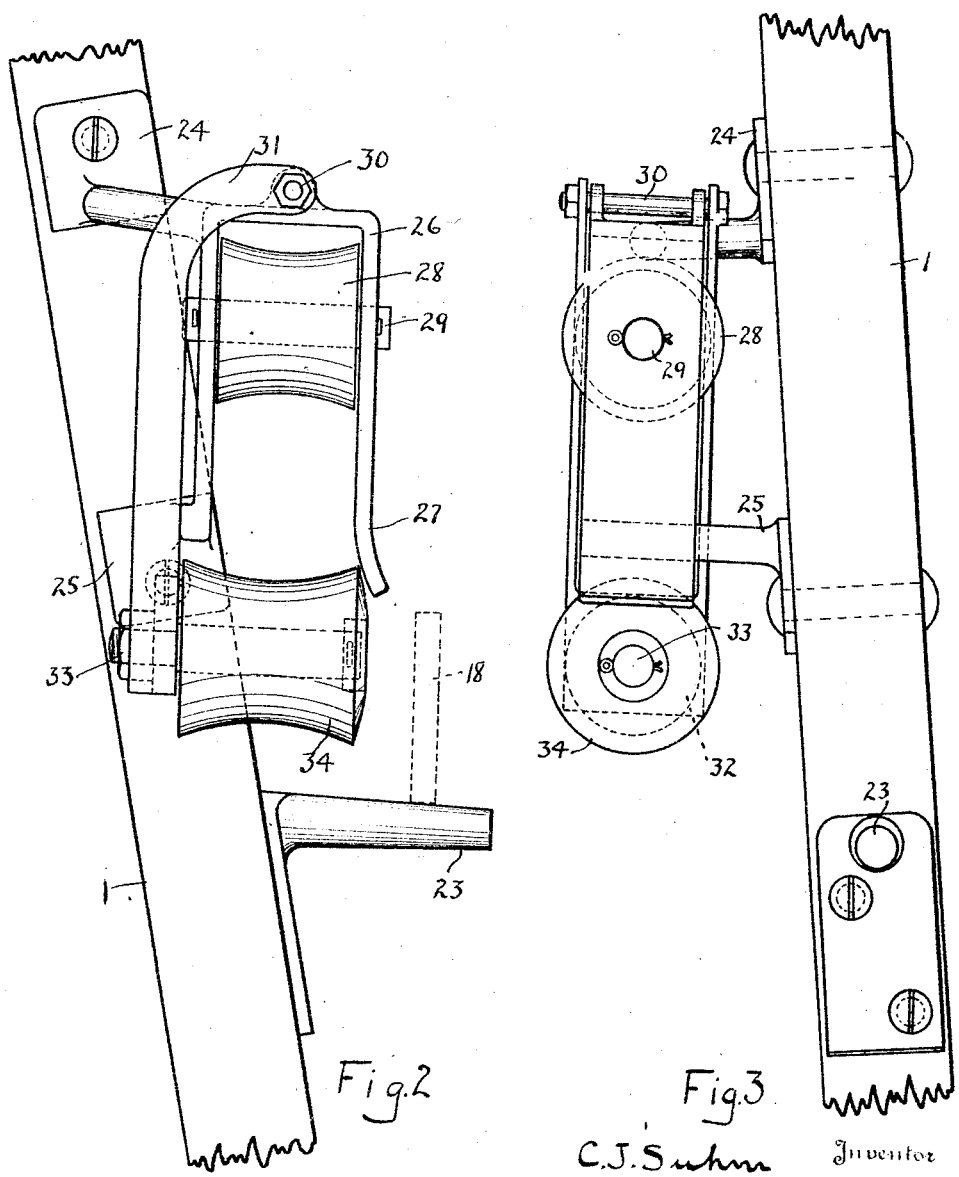

Patented Aug. 11, 1925.

1,549,159

UNITED STATES PATENT OFFICE.

CARL J. SUHM, OF HOUSTON, TEXAS.

WEIGHING-MACHINE ATTACHMENT.

Application filed February 19, 1924. Serial No. 693,754.

*To all whom it may concern:*

Be it known that I, CARL J. SUHM, a citizen of the United States, residing at Houston, Texas, have invented a certain new and useful Improvement in Weighing-Machine Attachments, of which the following is a specification.

My invention relates to a device for attachment to the arm of a weighing device to retain it in position when not in use. It is particularly adapted for use with weighing devices for handling bales of cotton, although it is capable of wider application.

In the use of the type of weighing device which is now ordinarily employed in weighing cotton, the scale arm of the weighing device must ordinarily be supported out of operative position when the bale of cotton is being secured in position for weighing.

The object of my invention is to provide a supporting device upon which the scale arm of the weighing machine may be readily engaged for support out of operative position.

It is also an object to provide supporting device for a scale arm upon which wear on the apparatus is practically eliminated.

In the drawings herewith wherein a preferred embodiment of my invention is disclosed, Fig. 1 is a side elevation of a weighing machine employing my invention; Fig. 2 is an enlarged detail of the supporting device in side elevation, and Fig. 3 is a front elevation of the device as shown in Fig. 2. Like numerals of reference are employed to designate like parts in all the views.

In Fig. 1, I have shown a type of weighing machine such as is ordinarily employed in weighing bales of cotton and similar objects. There is a supporting horse having upright legs 1 and a central cross beam 2 furnishing a frame work for the machine. A hand lever 3 is pivotally supported at 4 upon an upright bar 5 connected with the frame 2. This lever is bent at a point spaced slightly from the support and the power arm is curved downwardly at 6 and provided with an opening in which may be secured an operating rope or cable 7. The weight arm 8 of the lever is connected at 9 to a link 10 extending through guides in the support 2 and having an opening 11 on the lower end into which may be engaged a supporting yoke 12 for the beam 13 of the weighing arm. This arm is supported on a knife edge 14 so that the beam may be balanced readily thereon. A plurality of weight engaging hooks 15 are secured upon a stirrup 16 suspended from the front arm of the weighing beam upon a knife edge 17. The scale arm 18 of the weighing beam extends laterally and is graduated in the usual manner, having thereon an adjustable weight 19 by which the weight of the cotton bale may be ascertained. Adjacent the outer end of the scale arm is a small adjustable weight 20 which may be secured in any one of the series of openings 21 in the arm.

Below the scale arm upon the support 1 is a small bracket 22 having an outwardly projecting pin 23 thereon against which the arm 18 may rest.

The support constituting the main part of my invention is adapted to retain the scale arm 18 in approximately horizontal position when the bales of cotton are being attached to or detached from the gripping means 15. The supporting device is shown particularly in Figs. 2 and 3. On the inner side of one of the supporting legs 1 above the bracket 22 are the brackets 24 and 25 at the upper and lower ends respectively, of an inverted U-shaped frame 26. This frame is opened downwardly the outer arm of the inverted U, being curved outwardly at 27. Adjacent the upper end of the frame is the roller 28 rotatable upon a cross pin 29 secured in the frame. Said roller is of smallest diameter intermediate the ends so as to better engage the scale beam of the weighing machine.

Pivoted at 30 on the upper cross member of the frame is a yoke, the side arms 31 of which are curved downwardly along the inner arm of the frame 26. This yoke extends below the end of the U-shaped frame and has at its lower end a connecting plate 32 in which is rigidly secured a supporting pin 33 for a roller 34 rotatable thereon at a point spaced vertically below the upper roller 28. This frame 31 and the roller 34 are adapted to be swung laterally away from the arm 27 of the frame upon the upper pivot 30, but will be adapted to be held in position vertically below the upper roller by gravity, it being obvious from the showing in Fig. 2 that the weight of the roller 34 will cause the yoke 31 to hang in a vertical position.

In the operation of this device, the scale beam 18 of the weighing machine when not in use will be raised by hand until it rests upon the pin 23 on the support 1. It will then be moved slidably inwardly toward the frame to engage the end of the roller 34 on the yoke 31. This will throw the roller inwardly on the pivot 30 so that the beam 18 may be raised upwardly along the arm 27 of the frame after which the yoke 31 of the roller 34 will swing by gravity back in position below the scale beam, thus acting to support the said beam allowing movement of the beam longitudinally along the two rollers 28 and 34 while the hooks 15 are again being engaged upon a bale of cotton or other material to be weighed. When a bale of cotton is engaged by the hooks ready for weighing, the arm may be released from the support by elevating it slightly and pushing the yoke 31 laterally from beneath the beam allowing it to drop down upon the pin 23 in position for the weighing operation.

The particular advantages of this device lie in the fact that the beam 18 may be readily engaged within the support by the use of only one hand by the operator, and when the arm is thus engaged, the usual swing and vibration upon the arm will not cause appreciable wear upon the beam. It allows a material amount of movement and swing without in any way tending to injure or wear the arm of the weighing machine. It is convenient to operate and results in a saving of wear upon the apparatus.

Having thus described my invention, what I claim as new and desire to protect by Letters Patent is:

1. In a weighing apparatus including a frame and a scale beam, the combination of a support for said beam comprising an inverted U-shaped member secured to said frame, a yoke pivotally supported on said member and depending therefrom, a top roller on said member and a supporting roller on said yoke held normally by gravity below said top roller.

2. In a weighing apparatus including a frame and a scale beam supported thereon, the combination of a support for said beam comprising an inverted U-shaped member, a top roller secured between the arms of said member, and a supporting roller supported to swing on said member and held normally by gravity vertically below said top roller.

3. In a weighing apparatus including a frame and a scale beam supported thereon, the combination of a support for said beam comprising an inverted U-shaped member, a top roller secured between the arms of said member, a supporting roller supported to swing on said member and held normally by gravity vertically below said top roller, and said supporting roller extending below the said member for the purpose described.

4. In a weighing apparatus, a frame, a lever fulcrumed thereon, a scale beam supported on said lever, a temporary support for said beam including a pin projecting laterally from said frame, a swinging yoke depending above said pin, a roller on said yoke upon which said beam may rest, and means acting to retain said beam on said roller.

5. In a weighing apparatus, a frame, a scale beam depending therefrom, a temporary support for said beam comprising a bracket on said frame, a yoke pivotally supported on said bracket to swing at right angles to said beam and a roller mounted on said yoke to extend laterally beneath said beam and support the same.

6. In a weighing apparatus, a frame, a scale beam depending therefrom, a temporary support for said beam comprising a bracket on said frame, a yoke pivotally supported on said bracket on an axis parallel with said beam, a laterally projecting roller at the lower end of said yoke to engage beneath said beam, and means adjacent said roller to slidably support said beam.

7. In a weighing apparatus, a frame, a scale beam depending therefrom, a temporary support for said beam comprising a bracket on said frame, a yoke depending pivotally from said bracket to swing in a plane at right angles to said beam, a laterally projecting roller on said yoke, and a guide above said roller for said beam said roller being held by gravity below said guide, In testimony whereof I hereunto affix my signature this 16 day of February, A. D. 1924.

CARL J. SUHM.